3,165,475
STRONTIUM COMPOSITION AND PROCESS
OF MAKING IT
Lawrence C. Amos, Longview, Wash., assignor to the United States of America as represented by the United States Atomic Energy Commission
No Drawing. Filed Sept. 7, 1962, Ser. No. 222,241
3 Claims. (Cl. 252—301.1)

The subject matter of this application is a novel strontium-containing composition and in particular a composition containing radioactive $Sr^{90}$. The application also deals with a process of preparing the novel composition.

$Sr^{90}$ in the form of inorganic salts is used as a heat source for thermoelectric generators.

Usually $Sr^{90}$ is recovered from solutions obtained in the processing of neutron-irradiated uranium fuel in the form of water-insoluble compounds, such as strontium oxide or strontium carbonate. These compounds are powders, the shipping of which can become hazardous when the containers are damaged; the loose radioactivity-emitting powders then are dispersed into the atmosphere and can be inhaled by human beings.

It is an object of this invention to prepare $Sr^{90}$-containing compounds in a dense and compact form, safe for shipping.

It is another object of this invention to prepare compounds of $Sr^{90}$ that are soluble in dilute acids, such as hydrochloric or nitric acid, so that they are easily convertible to other compounds desired.

These objects are accomplished by mixing strontium oxide or strontium carbonate powders with lithium fluoride, melting the mixture whereby a homogeneous viscous mixture is obtained and cooling the mass for solidification.

Lithium fluoride is preferably added in an amount of between 0.85 and 5 moles per one mole of strontium compound. The temperature should be at least 800° C. in order to melt the mass, but it is preferably about 870° C. or above.

*Example*

To each mole of strontium carbonate, 0.85 mole of lithium fluoride was added, and the mixture was fused at a temperature of about 900° C., preferably under agitation, until a homogeneous viscous liquid was obtained. The mass was then allowed to cool to room temperature. A rock-like product was obtained that had a density of about 3.2 g./cm.$^3$. The product dissolved in tap water of a rate of 0.002 g./hr./cm.$^2$ of exposed surface.

An analogous experiment was carried out under identical conditions, but using strontium oxide instead of strontium carbonate. The product showed a water solubility of 0.08 g./hr./cm.$^2$. Both strontium compositions were readily soluble in dilute hydrochloric acid and in dilute nitric acid.

It will be understood that the invention is not to be limited to the details given herein but that it may be modified within the scope of the appended claims.

What is claimed is:

1. A method of handling $strontium^{90}$ consisting in mixing a $strontium^{90}$ compound selected from the group consisting of $strontium^{90}$ oxide and $strontium^{90}$ carbonate with lithium fluoride, melting the mixture obtained at above 800° C. whereby it reacts, cooling the reaction product, and dissolving the reaction product in mineral acid.

2. The process of claim 1 wherein lithium fluoride is added in a quantity of between 0.85 and 5 moles per one mole of strontium compound.

3. The process of claim 1, wherein the melting temperature is about 900° C.

References Cited by the Examiner

Ludekens et al. Chem. Abs., vol. 47, pp. 4723 to 4724 (1953).

AEC Document CF-57-2-20, Mar. 12, 1957.

The Condensed Chemical Dictionary fifth edition, Reinhold Publishing Co., 1956, page 1037.

C & E News, December 11, 1961, pages 62–64.

CARL D. QUARFORTH, *Primary Examiner.*

REUBEN EPSTEIN, *Examiner.*